United States Patent [19]

Anolick et al.

[11] Patent Number: 5,543,495
[45] Date of Patent: Aug. 6, 1996

[54] PROCESS FOR INCREASING THE MOLECULAR WEIGHT OF POLYAMIDES AND OTHER CONDENSATION POLYMERS

[75] Inventors: Colin Anolick, Wilmington; Gregory D. Cramer, Seaford; Ramdas Dujari, Seaford, all of Del.; Win-Chung Lee, Salisbury, Md.; Sundar M. Rao, Seaford; Robert C. Wheland, Wilmington, both of Del.

[73] Assignee: E. I. du Pont de Nemours and Company, Wilmington, Del.

[21] Appl. No.: 207,733

[22] Filed: Mar. 8, 1994

[51] Int. Cl.$^6$ ............................. C08G 69/46; C08G 69/48
[52] U.S. Cl. ..................... 528/481; 528/480; 528/483; 528/501; 528/502 C; 528/503; 525/419; 525/420
[58] Field of Search ..................... 528/480, 501, 528/483, 502–503; 525/419, 420

[56] References Cited

U.S. PATENT DOCUMENTS

| | | | |
|---|---|---|---|
| 3,040,005 | 6/1992 | Bernhardt et al. | 528/481 |
| 3,509,107 | 4/1970 | Brignac | 528/487 |
| 3,535,285 | 10/1970 | Breliner et al. | 204/155 |
| 3,558,569 | 1/1971 | Goto et al. | 528/481 |
| 3,668,161 | 6/1972 | Nauman et al. | 528/501 |
| 3,742,093 | 6/1973 | Skidmore | 528/501 |
| 4,094,942 | 6/1978 | Nakai et al. | 264/102 |
| 4,392,804 | 6/1983 | Pushee et al. | 425/174.8 |
| 4,760,129 | 7/1988 | Haering et al. | 528/481 |
| 4,963,650 | 10/1990 | Bokareva et al. | 528/481 |
| 5,140,098 | 8/1992 | Pipper et al. | 525/420 |
| 5,142,000 | 8/1992 | Wheland | 525/420 |
| 5,236,645 | 8/1993 | Jones | 264/78 |

FOREIGN PATENT DOCUMENTS

| | | |
|---|---|---|
| 0410230 | 1/1991 | European Pat. Off. . |
| 0410650 | 1/1991 | European Pat. Off. . |
| 0477634 | 1/1992 | European Pat. Off. . |
| 4-76023 | 3/1992 | Japan . |

OTHER PUBLICATIONS

Simon, R. H. M. (Monsanto), "Flash and Falling Strand Devolatilizers" (lecture outline), Apr. 4, 1985.

*Primary Examiner*—James J. Seidleck
*Assistant Examiner*—P. Hampton-Hightower

[57] ABSTRACT

This invention concerns a process for increasing the molecular weight and viscosity of polyamides and other condensation polymers, by first injecting an inert gas into the polymer melt at elevated pressure, then stripping the volatiles from the polymer through the application of reduced pressure, followed by holding the polymer at elevated temperatures long enough for the reaction to occur. Activators may be added to the polymer. Port areas used in the stripping zone, may be kept hot for continuous operation.

41 Claims, 1 Drawing Sheet

PROCESS FOR INCREASING THE MOLECULAR WEIGHT OF POLYAMIDES AND OTHER CONDENSATION POLYMERS

FIELD OF THE INVENTION

This invention concerns a process for increasing the molecular weight and viscosity of polyamides and other condensation polymers, by first injecting an inert gas into the polymer melt at elevated pressure, then stripping the volatiles from the polymer through the application of reduced pressure, followed by holding the polymer at elevated temperatures long enough for the reaction to occur. Activators may be added to the polymer to reduce the holding time needed for reactions to occur. Vent port areas used in the stripping zone, may be kept hot for continuous operation.

TECHNICAL BACKGROUND

U.S. Pat. No. 3,040,005 discloses a process for the reconditioning and melt extrusion of condensed polyamides to give products of increased molecular weight and improved physical properties. A combination of mechanical work and vacuum is used to remove the water produced in the polymerization reaction and thus allow the molecular weight to increase. The residence time needed in the high vacuum area is 1 to 10 minutes to allow the simultaneous evaporation and reaction. Use of nitrogen sweeping through this section of the extruder was found to be equivalent to using a vacuum; thus using nitrogen at 2 psig was equivalent to a strong vacuum of 23.3 in Hg (223 millibar). Color was better when nitrogen was used. Where nitrogen was used, large quantities were needed (0.36 to 1.68 kg/kg of polymer). The technology taught in U.S. Pat. No. 3,040,005 is effective at the scale described in the patent examples. However, at the higher capacities required for industrial facilities, the molecular weight is increased to a much lower extent. Evaporation of the product of the condensation reaction is less effective because the molecules of the evaporating species must diffuse through larger distances of the polymer melt. Therefore commercial applications of this technology have been limited.

U.S. Pat. No. 4,760,129 discloses a process for the preparation of highly viscous polyhexamethyleneadipamide which comprises the steps of: introducing a melt of polyhexamethyleneadipamide into an extruder having a plurality of degassing zones; polycondensing the polymer in the extruder in a plurality of serially arranged zones of alternatingly elevated (above atmospheric pressure) and reduced (below atmospheric pressure) pressure; supplying superheated steam to the zones of elevated pressure; drawing off input vapor and water of condensation in the reduced pressure zones; and raising the temperature of the melt at a uniform rate over the length of the extruder. Large volumes of stripping gas are required, typically 0.1 to 0.5 kg of steam per kg of polymer. It is stated that the steam is needed to create foam and increase the amount of surface area for evaporation of the moisture produced by the reaction. Process temperature and vacuum levels are increased from port to port and molecular weight is increased. The patent states that no fewer than two stages are required. The disadvantages of the technology taught in U.S. Pat. No. 4,760,129 are the large quantities of steam required, and the complexity of the extruder required, since multiple evaporation ports are needed.

U.S. Pat. No. 5,236,645 discloses a process for introducing additives into a thermoplastic melt comprising the steps of: a) feeding at least one additive in an aqueous vehicle containing a dispersant to form an aqueous additive stream to a vented extruder which is extruding a thermoplastic; b) volatilizing the aqueous portion of the aqueous additive stream; c) removing substantially all the volatilized aqueous portion through the extruder vent to achieve a substantially homogeneous system containing the thermoplastic and at least one additive; and d) forming a fiber from the homogeneous system by extrusion of the homogeneous system through a spinneret. U.S. Pat. No. 5,236,645 describes a method of adding additives to a polymer melt but does not address a method for increasing the molecular weight of the polymer.

A practical limitation exists for all technologies where vent ports are used on condensation polymers. It is difficult to maintain a vacuum for long periods because a small amount of low molecular weight polymer evaporates in the vacuum area, settles or condenses on the equipment walls causing degraded polymer and eventually plugs the gas passage or falls down into the melt contaminating the melt. The existing art does not address these problems.

Before manufacture of moldings, extrusions or fibers, polyamide prepolymer melts are conventionally subjected to heat and vacuum in a variety of processing vessels in order to increase the molecular weight, or relative viscosity (RV) of the polymer to one that gives the appropriate physical properties and processing characteristics to the polymer. Alternatively, the polymer in pellet form is "solid phase" polymerized by passing warm dry gas over the polymer. Conventional melt polymerization processes might subject the polymer to heat and vacuum for a number of minutes, while solid phase polymerization might take many hours. In these cases the rate at which the polymer molecular weight is increased is limited by the rate at which water vapor can be removed from the melt or the solid particle. Commercially the polymer is often melt polymerized in autoclaves or continuous polymerization units to an RV of about 43, this being the molecular weight that is readily obtained in atmospheric pressure vessels. If higher melt viscosities are needed such as for improved spinning characteristics, the polymer is usually increased in molecular weight either by subjecting it in melt form to vacuum, or by solid phase polymerization as described above.

Another problem inherent in the prior art is the need to deal with moisture absorbed by the polymer during storage or shipment and prior to increasing molecular weight. For example, in solid phase polymerization, care must be taken to control moisture in the stripping gas and a significant part of the process time is simply used to remove moisture that might have been absorbed by the polymer, since polyamide absorbs moisture very easily. The present invention avoids the need for a separate drying step.

In the laboratory it is often possible to obtain significant increases in molecular weight or RV by the application of vacuum, agitation and gas sweeps. However, when rates are increased to industrial scales, residence times in vacuum zones are decreased, and molecular weight increases are less dramatic. Thus, there is a need for a process that reduces the time the polymer must spend in the equipment and thus improves quality and reduces expense, even at industrial rates. The present invention teaches such a process.

The prior art processes can be summarized in the following way. During condensation polymerization, the degree to which monomers are polymerized, and thus the molecular weight of the product, is limited by the laws of chemical mass action. This limit can be described in terms of an equilibrium between end groups on the polymer chains which produces longer polymer chains while the backward reaction is between dissolved by-product and amide or ester (in the case of polyamide and polyester, respectively) groups in the polymer which produces shorter chains. In the case of nylon 66, the end groups are amine and carboxyl groups, the by-product is water and the hydrolyzable groups are amide groups in the chain. The backwards reaction is often called the hydrolysis reaction. In order to promote the forward reaction in nylon and obtain high molecular weight, the byproduct water must be removed.

Based on these principles, it is generally believed that condensation polymerization requires the careful removal of any absorbed moisture, followed by the continuous removal of by-products during the course of the polymerization. For this reason, prior art processes have concentrated first on removing any absorbed moisture, followed by a lengthy removal of by-products. In the case of polyamides, after the polymer is dried, water formed by the polymerization is removed, in vapor form, and this is done by holding the melt under a vacuum for a significant period or in multiple stages in order to keep the polymerization moving forward. Normally, an effort is made to generate surface area in the polymer melt for water evaporation and to do this for long enough periods for the reaction to continue. U.S. Pat. No. 3,040,005 and U.S. Pat. No. 4,760,129 follow this procedure. The high residence time during evaporation required by the known processes is one reason why the technology is difficult to use on an industrial scale, since large expensive equipment is needed to maintain the vacuum for extended periods. High vacuum and or high volumes of sweep gas are also required, thus increasing the expense. The process of the present invention demonstrates that molecular weight can be increased by rapidly removing the dissolved by-products of condensation polymerization, such as water, providing that suitable devolatilization techniques are used and that the polymer melt is allowed suitable residence time after this stage. In the process of the present invention, the bulk of the reaction is done after the stripping step. In prior art processes the by-product was removed continuously or in multiple stages simutaneous with the reactions. The process taught herein produces high yields in standard equipment capable of commercial operation. Since the residence time under vacuum is short, the equipment needs are relatively inexpensive.

SUMMARY OF THE INVENTION

This invention provides a process for increasing the molecular weight of condensation polymers, said process performed in a pressurized vessel on a polymer in melt form, the process comprising the steps of:

(a) injecting and mixing a stripping agent into the polymer melt, in the optional presence of an activator, while the melt is kept under elevated pressure so as to result in a polymer condensation reaction, with the concurrent production of evaporated gases;

(b) reducing the pressure of the polymer melt so that the partial pressure of the product of condensation reaction is reduced and removing the evaporated gasses and stripping agent through a vent port; and (c) after removing the evaporated gases and stripping agent, holding the polymer melt at reaction temperature for a sufficient time to allow the reaction to proceed to a desired increased molecular weight.

The optional activator may be added to the polymer melt at any time prior to holding the polymer at reaction temperature (step c), to reduce the required reaction time.

To assure continuous operation, the vent port area, where gasses are removed, may be kept at an elevated temperature.

Any equipment configuration, including a single vessel, that allows the above sequential steps may be employed.

Figure 1:
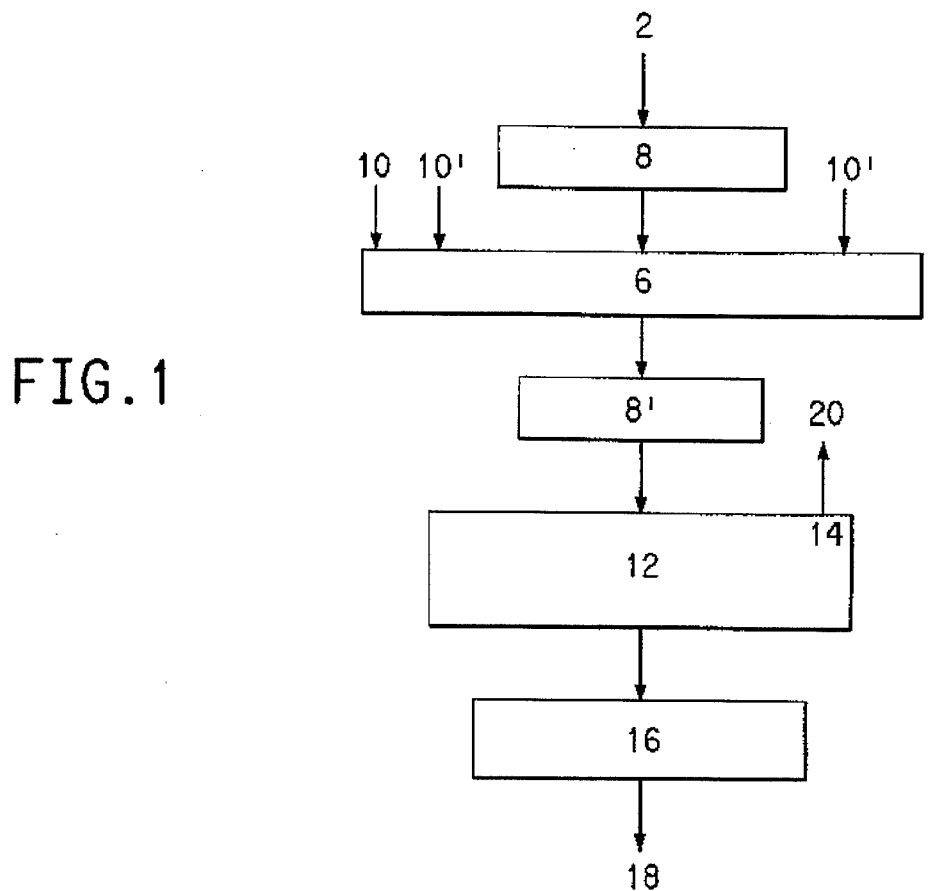
FIG. 1 is a schematic representation of a continuous operation including the above steps (a), (b) and (c). Polymer melt 2 is injected under pressure into vessel 6 which is sealed by seals 8 and 8'. Stripping agent, and, optionally an activator, is added to the polymer melt 2 though valves 10 and 10'. Thorough mixing is performed in vessel 6. The melt is then moved to vessel 12, pressure is reduced in the melt, which allows the gases 20 to be removed at vent port 14. The polymer melt is then moved to vessel 16 and retained at the reaction temperature until the product reaches the desired molecular weight and is discharged through port 18.

A mixture of polymer and inert gas 11 and, optionally, activator 13 feeds to the extruder 15. A vacuum gas vent area 17 allows the removal of stripping gas and gaseous by-products of previous reactions from the system. Polymer product is collected and kept heated at post-extruder holding zone 19 which is connected to a heating means (not shown) which enables extruded material to be kept at an elevated temperature.

DETAILED DESCRIPTION OF THE INVENTION

The condensation polymers to which the process of the present invention may be applied include, polyesters, especially polyethyleneterephthalate, and polyamides, especially nylon 6, nylon 66, and nylon 612.

The activators incorporated into the process of the present invention vary according to the type of polymer to which the process is applied. For nylon 66, for example, the activators may include sodium hypophosphite (SHP), manganese hypophosphite (MnHP), phenylphosphinic acid (PPA) or 2-(2'-pyridyl)ethylphosphonic acid (PEPA), or equivalents thereof. Most preferred for nylon 66 is 2-(2'-pyridyl)ethylphosphonic acid (PEPA).

The stripping agent selected also varies with the polymer used. Most commonly used stripping agents are steam, and inert gases such as nitrogen, carbon dioxide or argon. Nitrogen, carbon dioxide and argon are usually preferred while steam is usually considered less effective. For example, in the case of nylon, lower pressure is required in the reduced pressure zone, and in the case of polyesters steam will hydrolyse the polymer.

Normally about 0.1% to 4.0% stripping gas will be used (based on polymer weight). Since the stripping mechanism is one of partial pressure reduction, the effectiveness of a stripping agent is inversely proportional to its molecular weight.

The elevated pressure under which the process of the invention is operated is any pressure above atmospheric. Most typically this pressure is 2 to 300 psig, preferably 5 to 150 psig.

The mixing of the stripping agent into the polymer is carried out in equipment designed for handling molten polymer, first under pressure, then under reduced pressure; typically this equipment is a twin screw extruder. Alternatively, a single screw extruder, or a series of vessels, pumps and valves or other equipment can be used; as long as the polymer melt is subjected to the same sequence of elevated and reduced pressures and a mechanism is incorporated so that the stripping gas is prevented from bypassing the mixing zone and leaking prematurely to the reduced pressure zone or to the feed or melting zone. Suitable equipment is described herein for the separation of gas from the polymer and for holding the polymer at reaction temperature for the hold time. It is also possible to carry out the process steps in a single vessel.

The reduced pressure employed in the present invention is less than 25 psia and preferably less than 20 psia. If steam is used as a stripping agent, these pressures must be further reduced to less than 10 psia, preferably less than 5 psia.

In the present invention the polymer melt is typically processed about 2° C. to about 75° C. above its melting point. For nylon 66, a temperature of 290° C. is optimally employed.

The time required for the process varies from a few seconds, for the time spent in the equipment (e.g., extruder), and a few minutes (1–15 minutes, preferably 1–5 minutes, depending on choice of activator) for the holding time after the reduced pressure is applied.

The process of the invention is applied to low molecular weight polymers in order to arrive at higher molecular weight polymer products. "Low molecular weight" herein refers to essentially any value molecular weight that can be increased by the process of the invention. Typically, the process of the present invention is applied to polymers of weight average molecular weight of 31,000. (equivalent to an Relative Viscosity (RV) of about 43). High molecular weight includes any value molecular weight higher than that of the starting material employed. Typically, the process of the present invention is used to prepare polymers of 39,000 weight average molecular weight (equivalent to an RV of about 65).

Relative Viscosity (RV) is the formic acid relative viscosity measured as described at col. 2, lines 42–51, in Jennings, U.S. Pat. No. 4,702,875. That patent describes this measurement as follows: "The relative viscosity (RV) of polyhexamethylene adipamide is the ratio of the viscosity of a solution of 8.4 percent (by weight) polymer in a solution of 90 percent formic acid and 10 percent water (by weight) at 25° C., to the viscosity of the formic acid-water solution, per se, measured in the same units at 25° C. U.S. Pat. No. 4,702,875 is incorporated herein by reference. Amine and carboxyl ends are determined by the methods described on pages 293 and 294 in Volume 17 of the "Encyclopedia of Industrial Chemical Analysis" published by John Wiley & Sons (1973). The number average molecular weight (Mn) for a linear 66 nylon may be calculated by dividing $2 \times 10^{-6}$ by the sum total of end groups (expressed in equivalents/$10^6$ grams of polymer) in the subject polyamide.

The percent moisture in the polyamide product is determined by Karl Fischer titration, as on pages 301–2 of the Wiley Analytical Encyclopedia.

Unlike other technologies described in the art, in this technology the volatile products of reaction are not removed continuously during the complete duration of the process. Instead, all stripping of dissolved water is performed at the beginning of the process. The surprising feature is that the process removes water so effectively at the beginning that no further evaporation of by-product water is required during or after the holding period.

By using the process of the present invention, the molecular weight of polyamides can be increased by from about 5 to 120 points of RV, using short residence time processing equipment such as an extruder, with added residence time. The results are obtained by the application of specific combinations of stripping agents such as nitrogen or other gases, vacuum, and chemical activators such as sodium hypophosphite (SHP), manganese hypophosphite (MnHP), phenylphosphinic acid (PPA) or 2-(2'-pyridyl)ethylphosphonic acid (PEPA).

Additional embodiments of the invention eliminate the need for drying of the polymer fed to the process, allow use of an activator dissolved in water solution, and reduce the oligomers retained in the polymer.

The process can also be applied to various condensation polymers. For example, when applied to polyethylene terephthalate (PET) the polymer can be extruded with no loss of molecular weight or even a slight increase, and with a reduction of retained oligomers. The process is most effective where the solubility of the by-product of the condensation reaction is relatively high, such as water in nylon, compared to ethylene glycol in PET, which has relatively low solubility.

In the present process, a melt of polyamide or other polymer, preferably above its melting point (typically 290° C. for polyamide) is subjected to increased pressure and mixed with a stripping agent. The polymer might already contain the activator of choice, should any be necessary, but alternatively the activator can be admixed in either the melting stage or at the same time as the stripping agent. Activator is selected from one or more of the group consisting of PEPA, SHP, MnHP and PPA and other activators well known in the art. These are normally used in the range 0.1 to 10 gm moles per million gm of polymer product. Typically the stripping agent is nitrogen or another relatively unreactive gas. Even water (or steam) can be used but higher vacuums are then needed if these are used. In extruders only seconds of mixing are needed (typically 5 to 10 seconds). The mixed polymer and stripping agent are then subjected to reduced pressure so that the polymer foams and the foam breaks so that polymer and vapor are easily separated. Vapor is removed through a port. In this stage again only 5 to 10 seconds of residence time are required. The partial pressure of water vapor in the separation zone (Zone 7) is controlled so that it is in the range of 0.3 psia to 10 psia (21 millibar to 690 millibar). Since this process is one in which the molecular weight of the polymer is limited by the water content in the melt at the end of the process, the quantity of stripping agent used (and even if one is needed at all) can be calculated by one skilled in the art of polymerization provided he or she has data for the equilibrium between water and molecular weight or viscosity and has the molecular weight and water content of the starting material. If this information is not known experimentation would give the correct operating conditions and the examples given below could be used as starting points. Typical conditions for nylon 66 are 0.1 to 3 part of nitrogen to 100 parts of nylon, a pressure of 3 psia to 16 psia (207 millibar to 1100 millibar) in the separation chamber where the polymer temperatures are 280° C. to 340° C.

After stripping the dissolved water, or other product of the condensation polymerization reaction, the polymer must be maintained hot for sufficient time for the condensation polymerization reaction to increase the molecular weight to the desired value. The required time can be significantly reduced by the addition of an activator such as PPA, SHP, MnHP or PEPA, for polyamide 66, for example. Benefits of this process are the rapid increase of the molecular weight of polyamide resin and the removal of part of the low molecular weight species, including those which can cause fouling in molds and similar resin processing equipment. These benefits accrue even where the polymer is not dried prior to entering the process, or when the activator is added in a water solution. This water would normally be expected to reduce molecular weight of the product but the drying process is so efficient that the expected decrease does not occur.

If further increases in molecular weight are needed, the process can be repeated. To be most effective some residence time is needed between stages to allow the reaction to proceed. By-product water which has been generated in the first stage will then be removed in the subsequent pressure and vacuum cycle.

Compared to processes of the prior art the advantages of the present process are:

The polymer does not need to be dried prior to feeding to the process.

Residence time of the molten polymer in the vacuum region is low, thus polymer degradation is minimized. (Vacuum operation is usually accompanied by air leaks. Thus, use of vacuum can lead to oxidative degradation of the polymer.) The residence time which is required later, after the vacuum stage (i.e., in zone E and, if necessary, zone F, FIG. 2) can be in inexpensive pipe, and can be minimized by the use of activators such as PEPA or PPA.

The number of ports in a vented extruder is minimized, thus the equipment used is less expensive. One stage is sufficient (i.e., one elevated pressure-reduced pressure cycle).

Use of stripping agent (inert gas) is kept to a minimum (less than 0.1 kg/kg polymer and usually less than 0.02 kg/kg of polymer). This is important in commercial machines, since ports must be designed to handle the gas velocity without polymer being entrained into the gas stream.

Vacuum requirements are minimized. This allows minimum investment in vacuum generating equipment. The technology described here typically uses 500 mbar compared to 30 mbar in U.S. Pat. No. 4,760,129. Although U.S. Pat. No. 3,040,005 describes the use of pressures in the ports of 1000 mbar, extremely high quantities of inert gas are needed (0.36 to 1.68 kg/kg of polymer).

Since the polymer is under vacuum for minimum time (15 seconds or less) and the vacuum is not extreme, the potential for oxygen leaks and subsequent oxygen caused color degradation is reduced to a minimum. The use of nitrogen in place of steam as stripping agent further reduces the potential of oxygen contamination since the quantities used are less and it is relatively easy to obtain nitrogen of the required purity.

The activator can be added as a pure substance, or either as a concentrate blended in with the polymer (nylon) feed, or as a solution in water. Water based activator feed is often the most convenient form. Where the polymer is nylon, the activator can also be in the form of a concentrate in a low viscosity polyamide fluid. The activator, in any of these forms, can be incorporated into the polymer feed to the extruder, it can be added to this stream, it can be injected into the processing equipment for example at the same place as the stripping gas, or it can be injected after the extruder vacuum stage, before the material reaches the holding zone or in the holding zone, provided that sufficient time is allowed at the reaction temperature to allow the polymer to reach a desired molecular weight. If added after the vacuum stage, it is preferred to add the activator incorporated as a concentrate in a low viscosity polyamide. If added in a water solution, the additional water might limit the RV of the resulting product.

When the moisture level in the nylon polymer melt is reduced and the polymer melt is held at reaction temperature for a sufficient time, the reaction will proceed to a desired increased molecular weight. In some cases, it may be desirable to increase molecular weight in a shorter time period. By addition of the activator to the melt after the extruder vacuum stage, before the holding stage, the amidation reaction rates can be increased significantly and the increased molecular weights can be obtained using a shorter length of piping and in a shorter time period. Activators useful for adding to the process at this stage to achieve increased molecular weight are selected from the group consisting of sodium sypophosphite (SHP), manganese hypophosphite (MnHP), phenylphosphinic acid (PPA), and 2-(2'-pyridyl) ethylphosphonic acid (PEPA). The removal of moisture can be accomplished by the process described earlier, i.e. injecting and mixing a stripping agent into the polymer melt at increased pressure and then reducing pressure to evaporate the resulting gases through the extruder vent port. This process can be used succesfully in large equipment at industrial rates. If the the vent port is kept hot it allows the process to be used for continuous periods of time without the ports becoming blocked.

The addition of activator after the drying stage can also increase molecular weights where other drying processes are employed. Examples of such other drying processes include drying the polymer melt in a finishing vessel by exposing melt to vacuum to remove moisture (as in a continuous polymerizer), drying the polymer melt in a finishing vessel with the melt exposed to nitrogen or inert gas and drying the polymer chips in a drying chamber prior to feeding the extruder in a closed system so that the level of drying is preserved.

In certain applications, as exemplified by fiber production, the predried polymer melt (using any of the above drying methods) is split into multiple streams feeding individual spinning pumps. By injecting the activator into some of the polymer streams and not into others and by varying the levels of activator in the several streams, different products can be made from the same polymer source.

GENERAL PROCEDURES

Polymer was processed in the equipment of FIG. 2 with the various stages functioning as described below.

All of the experiments described herein were performed with twin screw co-rotating extruders in which the residence time for the polymer in the extruder varied and was often less than one minute. Additional residence time up to five minutes was provided outside the extruder during which time the polymer was maintained hot. Alternative equipment can be used. The gas must be added under an elevated pressure and mixed into the polymer melt. Any gas and dissolved reactants are removed in a single lower pressure step, and the polymer melt is then given time to complete the reaction. Where catalyst is present, this additional time is shortened.

In the first stage of the extruder (1, FIG. 2) the polymer was melted by the application of heat and shear, and then pressurized. At the end of the melting section there was a seal section on the screw (3) where the polymer was forced through a pressure zone and then enters the second stage (5). The seal section (3) was a short section of screw where the flights are arranged in reverse direction. Other techniques for holding the polymer melt under pressure can be used. In the second stage of the extruder (5), an inert stripping agent was added to the polymer and mixed therewith under some elevated pressure typically 5 psig to 150 psig (1.3 to 11.4 bar). Suitable mixing elements were incorporated in section 5. The stripping agent was nitrogen. The polymer melt and nitrogen gas were mixed in this section while still being held at an elevated pressure. Since the stripping gas is pumped into this zone at a specified rate, the pressure is not specifically controlled and is sufficient to pass into the mixing section and to be incorporated into the melt. The mixture was then pumped through another seal section (3') into the third stage of the extruder (7), where the polymer was subjected to reduced pressure. The pressure in this section was below the pressure in section 5 and normally below atmospheric. The function of Seal 3' is to prevent the stripping gas from escaping directly to the gas exit port. The pressure in the reduced pressure zone can be maintained above atmospheric provided the partial pressure of water in the gas stream is low enough to obtain the desired molecular weight. The correct partial pressures of water is defined below. The fourth and final stage of the extruder (21) was used to pressurize the polymer and pump the melt out of the machine, where it was cooled and cut. In some experiments, at low rates, the polymer residence time in the extruder, after stripping, was sufficient that the polymer molecular weight increased significantly. In other experiments, typically at high rates, additional residence time was provided in a vessel or pipe length (19) to allow time for the chemical reaction to proceed.

The partial pressure of water maintained in the vacuum section (section 7) was found to be typically between 0.3 psia and 10 psia depending on the viscosity required in the product. It was necessary to increase the flow of nitrogen if the incoming polyamide polymer was wet. It was necessary to maintain the polymer at high temperature for a period of time long enough to complete the polymerization reaction. The chemical reaction to increase viscosity was initiated by the stripping process. The required residence time could be shortened by using additional activator.

EXAMPLES 1–6

28 mm extruder

Figure 2:
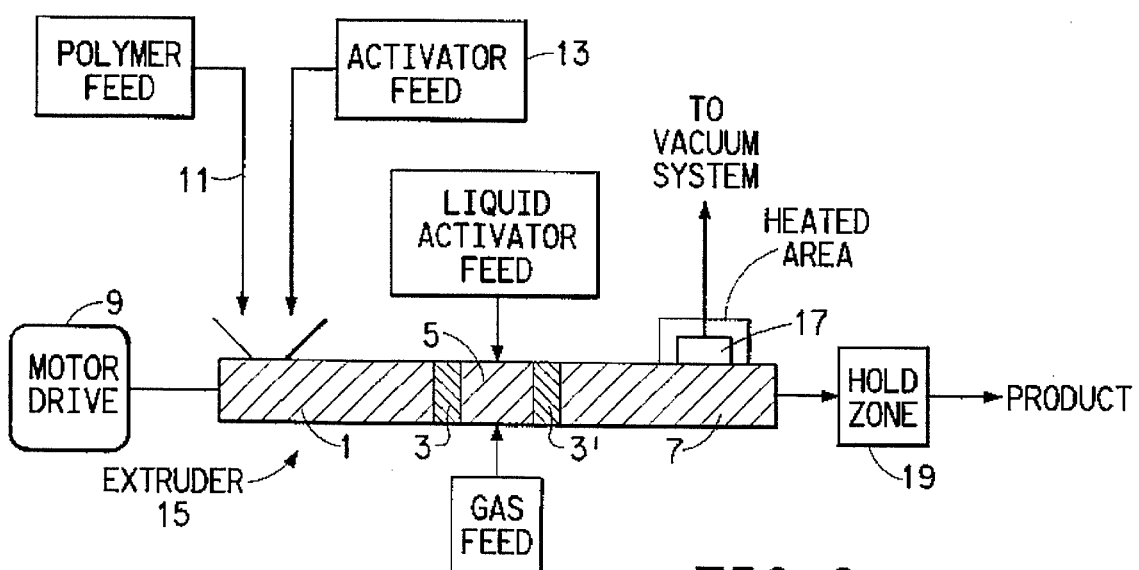
FIG. 2 shows an extruder 15 in which the process of the present invention can be carried out. Numbers 1, 3, 3' 5 and 7 signify five sections of the extruder 15. 9 is a drive motor. Seal sections are labeled as 3 and 3'. Zone 1 is used to melt the polymer and pressurize it through the first seal 3. In Zone 5, stripping agent is added. The stripping agent is prevented from escaping prematurely, by the two seal zones (3 and 3'). In Zone 7, stripping agent, moisture and any vaporous by products of previous reactions are removed through vent 17, while Zone 21 is used to pump the polymer melt from the extruder and through the hold zone (19). Activator can be added at various points, provided that sufficient time is provided at reaction temperature for the polymer to reach a desired molecular weight. The vent 17 in Zone 7 may be heated to a temperature of 5° C. to 40° C., preferably 10° C. to 20° C. above the temperature of the melt in the reduced pressure zone. Typically, in the case of nylon 66, this temperature is about 300° C. to 340° C. This prevents rapid deposit of polymer in the port area, which may cause plugging of the port, and allows continuous operation for long periods.

In the examples in Table 1, Nylon 66 with an RV of 44 to 46 is fed to a 28 mm twin screw corotating intermeshing extruder as shown in FIG. 2. Polymer feed rates are all in the range of 9 to 11 lb/hr (4.1 to 4.9 kg/hr). Temperatures of 290°+/–10° C. are used. Vacuum is applied to the vent port as indicated in the table. In these examples when activator (PEPA, 2-(2-pyridyl)ethylphosphonic acid) was used it was first dissolved as a concentrate in nylon 66. The appropriate quantity of the concentrate was then added together with the feed nylon (see FIG. 1). The polymer leaving the extruder is quenched, cut and tested. It was found to have an increased RV as shown in Table 1. Comparative Examples 1 and 2 use vacuum, but no nitrogen or activator. Comparative Examples 3 and 4 use vacuum and nitrogen, but no activator. Comparative Example 6 uses vacuum and activator, but no nitrogen. It is apparent that application of vacuum with or without nitrogen stripping will produce useful increases in RV at these rates and in this laboratory scale equipment. When the combination of nitrogen, activator (PEPA) and vacuum is used, as in Example 5, much larger increases in RV are obtained. In Example 5 an increase of 49 points of RV was obtained using the combination of vacuum, nitrogen and activator, whereas even at these low rates using any combination of two of these conditions only, a much smaller increase in the RV was obtained, only 10 to 18 points. Unexpected synergism occurs between vacuum, nitrogen flow and chemical activator when all three are present, and the process was effective even though the polymer was not predried.

TABLE 1

| Ex. # | Extruder Screw Diam. (mm) | Polymer Rate (Lb/hr) | Polymer predried | Absolute Pressure mm Hg | N2 lb/lb polymer | Activator (mol/$10^6$ gm) | Initial RV | Product RV | DRV |
|---|---|---|---|---|---|---|---|---|---|
| 1 | 28 | 9 | Yes | 610 | 0 | 0 | 45 | 54 | 9 |
| 2 | 28 | 9 | Yes | 310 | 0 | 0 | 45 | 64 | 19 |
| 3 | 28 | 8.8 | No | 460 | 0.1989 | 0 | 44.4 | 54.7 | 10.3 |
| 4 | 28 | 10.9 | Yes | 310 | 0.1761 | 0 | 45 | 63.3 | 18.3 |
| 5 | 28 | 11 | No | 480 | 0.1955 | 10 | 44.4 | 93.5 | 49.1 |
| 6 | 28 | 11.2 | Yes | 612 | 0 | 8.9 | 44 | 67.4 | 23.4 |

EXAMPLES 7–10

53 mm extruder

The results shown in Table 2 were obtained in 53 mm extruders at higher rates. Examples 7–10 are under conditions of the invention; each employs vacuum, nitrogen and activator. These results are representative of what can be obtained in industrial scale equipment. At the moderate rates (100 lb/hr) significant increases in viscosity are obtained even without additional residence time. The time that the polymer is in the machine itself is sufficient to allow the RV increase. However, when the rates through the extruder are increased to 250 lb/hr, additional residence time was provided in a vessel or pipe length (zone 19 in FIG. 2) to allow time for the chemical reaction to proceed. In this example, a section of heated pipe was employed as zone 19. This example demonstrates that the technology is effective at commercial production rates provided time is allowed for the chemical reactions to occur even though no provision for additional by-product water removal is provided and the polymer is not predried.

and this activator bearing nylon is then blended into the rest of the polymer when both it and activator free nylon are fed to the extruder. In Example 18, the activator is dissolved in water and the aqueous solution is injected into the same section of the extruder as the nitrogen, i.e., section C. The results are essentially the same. A surprising result is that this addition of water with the catalyst does not appreciably decrease the viscosity of the product. In Examples 18 and 19 are compared two methods of adding catalyst. In both the catalyst is added as a solution in water. In Example 19 the catalyst is injected into the same section of the extruder as the nitrogen, (Section 5, FIG. 2) and in Example 20 the catalyst is pumped onto the polymer pellets as they enter the extruder hopper. The results are essentially equivalent. The advantage to pumping the catalyst into the extruder hopper is that it needs simpler equipment and the port is less subject to plugging. The resulting fluctuations in product RV are thus smaller.

TABLE 2

| Ex. # | Extruder Screw Diam. (mm) | Polymer Rate (Lb/hr) | Polymer predried | Absolute Pressure mm Hg | N2 lb/lb polymer | Activator (mol/$10^6$ gm) | Added time sec. | Initial RV | Product RV | DRV |
|---|---|---|---|---|---|---|---|---|---|---|
| 7 | 53 | 99 | No | 380 | 0.0239 | 2.12 | 0.0 | 45.7 | 71.4 | 25.7 |
| 8 | 53 | 252 | No | 407 | 0.0161 | 3.17 | 0.0 | 41.8 | 47.6 | 5.8 |
| 9 | 53 | 260 | No | 445 | 0.0145 | 7.69 | 0.0 | 42.1 | 55.1 | 13 |
| 10 | 53 | 260 | No | 445 | 0.0145 | 7.69 | 125.6 | 42.1 | 81.2 | 39.1 |

EXAMPLES 11–16

Demonstration of Various Activators

In Table 3 are shown results with other activators. These experiments were performed using a 30 mm extruder. Comparative Example 11 is a control with no activator. It is apparent that all these activators are effective although their efficiencies vary. Most effective is PEPA. Higher levels of the less effective activators can be used to compensate for decreased activity. Of the many catalysts known in the art that can be used, the choice of catalyst can be made for economic or product quality reasons.

TABLE 3

| Ex. # | Extruder Screw Diam. (mm) | Polymer Rate (Lb/hr) | Absolute Pressure mm Hg | N2 lb/lb polymer | Activator Type | Activator (mol/$10^6$ gm) | Initial RV | Product RV | DRV |
|---|---|---|---|---|---|---|---|---|---|
| 11 | 30 | 10.4 | 380 | 0.0846 | 0 | 0 | 53.4 | 65.9 | 12.5 |
| 12 | 30 | 15.2 | 455 | 0.0605 | PEPA | 3.3 | 53.5 | 136.2 | 82.7 |
| 13 | 30 | 12.2 | 404 | 0.0746 | PPA | 4.1 | 51.4 | 93.3 | 41.9 |
| 14 | 30 | 14.2 | 404 | 0.0634 | SHP | 3.5 | 51.4 | 118.4 | 67 |
| 15 | 30 | 12.1 | 404 | 0.0719 | SHP | 8.3 | 51.4 | 135.9 | 84.5 |
| 16 | 30 | 14.4 | 430 | 0.0632 | PEPA + SHP | 3.6 | 53.5 | 140.9 | 87.4 |

EXAMPLES 17–18

Modes of Activator Addition

The results shown in Table 4 for Examples 17 and 18, both of the invention, demonstrate that the activator, in this case PEPA, can be added in various ways. In Example 17, the activator is first dissolved in a small quantity of nylon

TABLE 4

| Ex. # | Extruder Screw Diam. (mm) | Polymer Rate (Lb/hr) | Polymer predried | Absolute Pressure mm Hg | N2 lb/lb polymer | Activator Form | Activator (mol/$10^6$ gm) | Added time sec. | Initial RV | Product RV | DRV |
|---|---|---|---|---|---|---|---|---|---|---|---|
| 17 | 53 | 205 | No | 370 | 0.0145 | Solid[a] | 4.88 | | 159.3 | 42.8 | 58.6 | 15.8 |
| 18 | 53 | 200 | No | 353 | 0.0145 | $H_2O$ soln[b] | 5.00 | | 163.3 | 43.3 | 56.9 | 13.6 |
| 19 | 30 | 10.1 | No | 300 | 0.0199 | $H_2O$ soln[b] | 4.97 | | 264.0 | 41 | 63.6 | 22.6 |
| 20 | 30 | 10.6 | No | 400 | 0.0196 | $H_2O$ soln[c] | 3.29 | | 252.0 | 42.6 | 64.7 | 22.1 |

[a]Solid Activator consists of 200 moles of PEPA/million gm of nylon added as a blend with the nylon feed
[b]$H_2O$ Soln. is PEPA added as a 42% solution in water, injected at nitrogen inlet.
[c]$H_2O$ Soln. is PEPA added as a 43.8% solution in water, injected into feed hopper

What is claimed is:

1. A process for increasing the molecular weight of polyamide or polyester polymers, said process performed in a pressurized vessel where the polymer is in melt form, which process comprises the successive steps of:
   (a) injecting and mixing steam or an inert gas, as a stripping agent, into the polymer melt, under elevated pressure, so as to result in a polymer condensation reaction, with the concurrent production of evaporated gases;
   (b) reducing the pressure of the polymer melt so that the partial pressure of the product of the polymer condensation reaction is reduced and removing the resulting evaporated gases through a vent port; and
   (c) after removing the evaporated gases, holding the polymer melt at reaction temperature for a sufficient time to allow the reaction to proceed to a desired increased average molecular weight.

2. Process of claim 1 where an activator is added to the polymer melt prior to the holding period described in claim 1 (c).

3. The process of claim 1 wherein the polyester is polyethyleneterephthalate.

4. The process of claim 1 wherein the polyester is polyethyleneterephthalate.

5. The process of claim 1 wherein the polyamide, is selected from the group consisting of nylon 6, nylon 66, and nylon 612.

6. The process of claim 1 wherein the polyamide, is selected from the group consisting of nylon 6, nylon 66, and nylon 612.

7. The process of claim 2 wherein the polymer is polyamide and the activator is selected from the group consisting of sodium hypophosphite (SHP), manganese hypophosphite (MnHP), phenylphosphinic acid (PPA) and 2-(2'-pyridyl)ethylphosphonic acid (PEPA).

8. The process of claim 7 wherein the activator is 2-(2'-pyridyl) ethylphosphonic acid (PEPA).

9. The process of claim 1 wherein the stripping agent is selected from the group consisting of steam, nitrogen, carbon dioxide and argon.

10. The process of claim 2 wherein the stripping agent is selected from the group consisting of steam, nitrogen, carbon dioxide and argon.

11. The process of claim 9 wherein 0.1% to 4.0%, based on polymer weight, of the stripping agent is used.

12. The process of claim 10 wherein 0.1% to 4.0% based on polymer weight, of the stripping agent is used.

13. The process of claim 1 wherein the the elevated pressure of step (a) is 2 psig to 300 psig.

14. The process of claim 2 wherein the the elevated pressure of step (a) is 2 psig to 300 psig.

15. The process of claim 13 wherein the elevated pressure of step (a) is 5 psig to 150 psig.

16. The process of claim 14 wherein the elevated pressure of step (a) is 5 psig to 150 psig.

17. The process of claim 1 wherein step (a) is carried out in a twin screw or single screw extruder.

18. The process of claim 2 wherein step (a) is carried out in a twin screw or single screw extruder.

19. The process of claim 1 wherein the reduced pressure employed in step (b) is less than 25 psia.

20. The process of claim 2 wherein the reduced pressure employed in step (b) is less than 25 psia.

21. The process of claim 19 wherein the reduced pressure in step (b) is less than 20 psia.

22. The process of claim 20 wherein the reduced pressure in step (b) is less than 20 psia.

23. The process of claim 1 wherein the stripping agent is steam and the reduced pressure in step (b) is less than 10 psia.

24. The process of claim 2 wherein the stripping agent is steam and the reduced pressure in step (b) is less than 10 psia.

25. The process of claim 23 wherein the reduced pressure in step (b) is less than 5 psia.

26. The process of claim 1 conducted at a temperature that is about 2° C. to about 75° C. above the melting temperature of the polymer used.

27. The process of claim 2 conducted at a temperature that is about 2° C. to about 75° C. above the melting temperature of the polymer used.

28. The process of claim 27 wherein the polymer is nylon 66 and the process is conducted at a temperature of about 290° C.

29. The process of claim 28 wherein the polymer is nylon 66 and the process is conducted at a temperature of about 290° C.

30. The process of claim 6 where the activator is added in the form of a solution in water.

31. The process of claim 6 where the activator is added as a dispersion in nylon or a low viscosity polyamide.

32. The process of claim 1 where the walls of the low pressure zone are heated to a temperature of 5° C. to 20° C. above the temperature of the polymer in the process.

33. The process of claim 2, where the walls of the low pressure zone are heated to a temperature of 5° C. to 20° C. above the temperature of the polymer in the process.

34. The process of claim 1 wherein the evaporated gases are removed through a heated vent port.

35. The process of claim 2 wherein the evaporated gases are removed through a heated vent port.

36. The process of claim 2 wherein the activator is added to the polymer melt after the removal of evaporated gases in step (c) and holding the melt at reaction temperature until the polymer reaches a desired number average molecular weight.

37. A process for increasing the molecular weight of a polyamide or polyester condensation polymer melt, after said polymer has been subjected to a drying process to remove moisture, said process performed in a pressurized vessel where the polymer is in melt form, which process comprises the steps of:
   (a) injecting and mixing steam or an inert gas, as a stripping agent, into the polymer melt, under elevated pressure, so as to result in a polymer condensation reaction, with the concurrent production of evaporated gases;
   (b) reducing the pressure of the polymer melt so that the partial pressure of the product of the polymer condensation reaction is reduced and removing the resulting evaporated gases through a vent port; and
   (c) after removing the evaporated gases, holding the polymer melt at reaction temperature for a sufficient time to allow the reaction to proceed to a desired increased number average molecular weight;
   wherein an activator is added to the polymer melt prior to the holding period described in part (c).

38. The process of claim 37 wherein the activator is selected from the group consisting of sodium hypophosphite (SHP), manganese hypophosphite (MnHP), phenylphosphinic acid (PPA) and 2-(2'-pyridyl) ethylphosphonic acid (PEPA).

39. The process of claim 2 wherein the activator is added at a concentration of about 0.1 gram to 10 grams per million grams of polymer product.

40. The process of claim 37 wherein the activator is added to said polymer melt while the polymer is subjected to a temperature of about 280° C. to 340° C.

41. A process for increasing the molecular weight of polyethyleneterephtalate, said process performed in a pressurized vessel where the polymer is in melt form, which process comprises the steps of:

(a) injecting and mixing steam or an inert gas, as a stripping agent, into the polymer melt, under elevated pressure, so as to result in a polymer condensation reaction, with the concurrent production of evaporated gases;

(b) reducing the pressure of the polymer melt so that the partial pressure of the product of the polymer condensation reaction is reduced and removing the resulting evaporated gases through a vent port; and (c) after removing the evaporated gases, holding the polymer melt at reaction temperature for a sufficient time to allow the reaction to proceed to a desired increased number average molecular weight.

\* \* \* \* \*